United States Patent [19]

Roth

[11] Patent Number: 5,270,719

[45] Date of Patent: Dec. 14, 1993

[54] TRANSMISSION/RECEPTION MODULE FOR AN ELECTRONICALLY PHASE-CONTROLLED ANTENNA

[75] Inventor: Dieter Roth, Munich, Fed. Rep. of Germany

[73] Assignee: Siemens Aktiengesellschaft, Munich, Fed. Rep. of Germany

[21] Appl. No.: 956,165

[22] Filed: Oct. 5, 1992

[30] Foreign Application Priority Data

Oct. 29, 1991 [DE] Fed. Rep. of Germany ... 9113444[U]

[51] Int. Cl.⁵ ............. H01Q 3/22; G01S 13/00
[52] U.S. Cl. ................ 342/157; 342/188; 342/361; 342/371
[58] Field of Search .............. 342/157, 175, 188, 198, 342/361, 368, 371

[56] References Cited

U.S. PATENT DOCUMENTS

| | | | |
|---|---|---|---|
| 4,084,137 | 4/1978 | Welti | 342/365 |
| 4,408,206 | 10/1983 | Fitch et al. | 342/365 |
| 4,951,060 | 8/1990 | Cohn | 342/175 |

OTHER PUBLICATIONS

Priolo et al., "Multifunction Transmit and Receive Modules for EW Arrays", *Microwave Journal*, Feb. 1991, pp. 83-92.

P. Bradsell, "Phased Arrays in Radar", *Electronics & Communication Engineering Journal*, Apr. 1990, pp. 45-50.

Davis et al., "L-Band T/R Module for Airborne Phased Array", *Microwave Journal*, Feb. 1977, pp. 54-60.

*Primary Examiner*—Mark Hellner
*Attorney, Agent, or Firm*—Hill, Steadman & Simpson

[57] ABSTRACT

A transmission/reception module suitable for use in electronically phase-controlled antennas for a synthetic aperture radar includes a circulator provided for each individual radiator element terminal to achieve vertical and horizontal polarization. A low-noise amplifier is connected to the circulator in the reception path. A high-power amplifier is connected to the circulator in the transmission path. The two separate polarization reception channels each include a low-noise amplifier. The two separate polarization transmission channels each include a high-power amplifier. The reception channels and transmission channels are respectively connected to a polarization change-over. Switching arms of the polarization change-over are then connected to either the reception contact or the transmission contact of the transmission/reception switch.

10 Claims, 2 Drawing Sheets

TRANSMISSION/RECEPTION MODULE FOR AN ELECTRONICALLY PHASE-CONTROLLED ANTENNA

FIELD OF THE INVENTION

The present invention relates generally to a transmission/reception module integrated in a microwave circuit for selectively charging a radiator element operating in vertical polarization and a radiator element operating in horizontal polarization.

BACKGROUND OF THE INVENTION

An active transmission/reception module can be used, for example, in a monolithically integrated microwave circuit embodiment (MMIC) for a radiator element operating in both vertical and horizontal polarization in an electronically phase-controlled antenna. Such an active transmission/reception module is discussed, for example, in M. Priolo et al, "Multifunction Transmit and Receive Modules for EW Arrays", *Microwave Journal*, pp. 83–92 (February 1991). The active transmission/reception module functions as an electronic counter-measure for active jamming in the transmit mode, and as an electronic reconnaissance system for frequency and signal identification in the receive mode. The active transmission/reception module is capable of vertical and horizontal polarization in both the transmit and receive modes.

Such an active transmission/reception module provides a 90° phase difference between the two power terminals, achieved by using quadrature hybrids and a polarization switch, in order to combine all of the transmission energy either at the vertical or horizontal polarization terminals during polarization switching. In the receive mode, the reception amplifiers are connected to the reception path according to the polarization selected, such that a deterioration of the noise factor is avoided. A transmission amplifier/four-way power-combining network includes a number of shunt switches. Transmit/receive switching is achieved by the shunt switches. For example, in the transmit mode, the switches operate in a condition having low loss, whereas the switches are switched into a highly reflective condition in the receive mode, thereby effecting conduction of the signal into the reception channel. However, such an active transmission/reception module requires the use of relatively complicated transmission/reception switches, as well as three dB hybrids.

Other known active transmission/reception modules in an integrated microwave circuit embodiment for use in an electronic phase-controlled antenna are discussed, for example, in M. E. Davis et al., "L-Band T/R Module for Airborne Phased Array", *Microwave Journal*, pp. 54–60 (February 1977), and in P. Bradsell, "Phase Arrays in Radar", *Electronics & Communication Engineering Journal*, pp. 45–50 (April 1990). Such transmission/reception modules, however, are only operative with respect to a single polarization, such that polarization switching is not required. A power amplifier is provided, and disposed in the transmission path between the transmit contact of the transmission/reception switch and a circulator terminal. Further, a low-noise amplifier is provided, and disposed in the reception path between another circulator terminal and the receive contact of the transmission/reception switch.

Based on the known transmission/reception modules, if one were to design a module for supplying both a radiator element for horizontal polarization and a radiator element for vertical polarization, then one would be led to connect a polarization change-over to the circulator and to apply its change-over contacts directly to the radiator element terminals for the respective polarizations. However, the entire antenna system including the transmission/reception module would deteriorate by at least 2 dB due to the loss contribution of such an arrangement of the polarization change-over.

Comparing such an embodiment of a transmission/reception module to a transmission/reception module without power polarization switch-over, the transmission output power would be lower by at least 1 dB and the reception noise factor would be higher by at least 1 dB. On the other hand, if the polarization switch-over were avoided, the relationship between the reception signal and the noise of the antenna system would be improved by approximately 2 dB with the same output power of the terminating receiver. As 2 dB approximately corresponds to a factor of 1.6, a 2 Watt power amplifier in a transmission/reception module without power polarization switch-over results in the same relationship between the reception signal and noise of the antenna system as in a 3.2 Watt power receiver in a transmission/reception module having power polarization switch-over. Thus, assuming a 40% power-enhanced power amplifier and without considering the power loss in the antenna power distribution system, approximately 38% of the power supply, or approximately 3 Watts per transmission/reception module, can be saved during the transmission phase in the antenna system when no polarization switch-over occurs between the power amplifier and the radiator element.

SUMMARY OF THE INVENTION

It is an object of the present invention to provide an active transmission/reception module for an electronic phase-controlled antenna that charges both a radiator element for vertical polarization and a radiator element for horizontal polarization, while providing a similarly beneficial signal-to-noise ratio as a module without polarization switching, such that high demands can be made of the polarization decoupling.

The above object is inventively achieved in an active transmission/reception module including a first circulator connected by a first terminal to a first radiator element. A second circulator is also provided, and is connected by a second terminal to a second radiator element. The first circulator is also connected to a switch-over contact of a polarization change-over through a first low-noise amplifier by a first branching terminal. The second circulator is also connected to the switch-over contact of the polarization change-over through a second low-noise filter by a second branching terminal. A switching arm of the polarization change-over is connected to a reception contact of a transmission/reception switch. A transmit contact of the transmission/reception switch is connected to a switching arm of a second polarization change-over. The second polarization change-over includes a first switching contact connected to an input of the first circulator through a first high-power amplifier, and a second switching contact connected to a second input of the second circulator through a second high-power amplifier. The first and second inputs correspond to one another, and provide branching of a transmit signal in the first and second circulators.

Thus, a transmission/reception module constructed in accordance with the principles of the present invention meets the enormous demands of the signal-to-noise ratio for a given power supply and provides savings in the primary power and in the overall system outlay with given system configuration requirements. An active transmission/reception module constructed in accordance with the principles of the present invention does not require either 3 dB couplers or complicated transmission/reception switches.

Other advantages and features of the invention will be readily apparent from the following description of the preferred embodiments, the drawings and claims.

DETAILED DESCRIPTION

Figure 1:
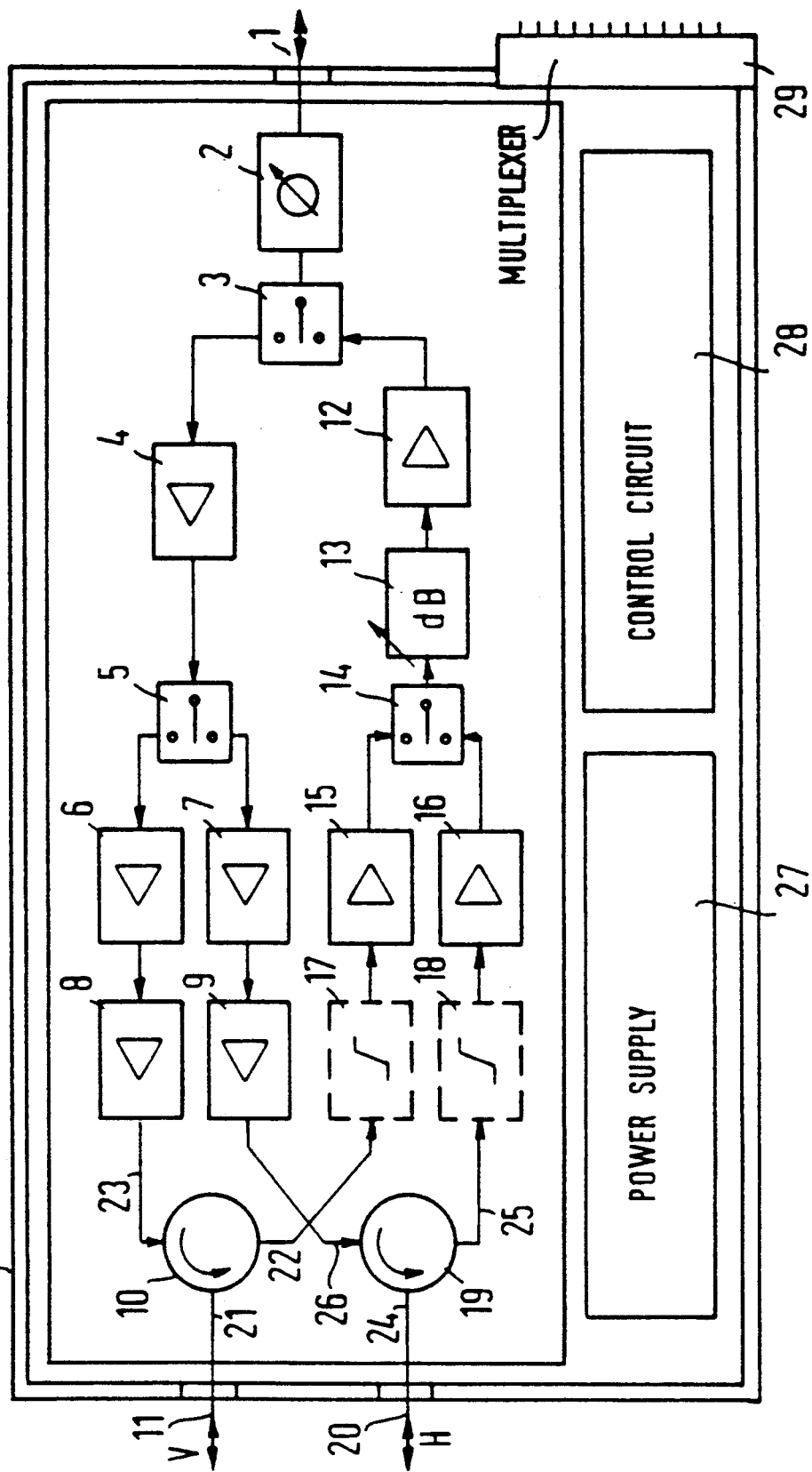
FIG. 1 illustrates a block circuit diagram of a transmission/reception module constructed in accordance with the principles of the present invention.

FIG. 1 illustrates a block circuit diagram of a transmission/reception module constructed in accordance with the principles of the present invention. The transmission signal proceeds through an antenna system feed terminal 1 to an electronically-controllable phase shifter 2. The transmission signal then proceeds from the electronically-controllable phase shifter 2 to a switching arm of a transmission/reception switch 3. The transmission signal then proceeds from a transmit contact of the transmission/reception switch 3 through a low-noise amplifier 4 to a switching arm of a polarization change-over 5. Where two polarization transmit channels are desired, high-power amplifiers 8, 9 are connected to the switch-over contacts of the polarization change-over 5 by linear driver amplifiers 6, 7, respectively. An output of the high-power amplifier 8 is connected to an input 23 of a circulator 10. Similarly, an output of the high-power amplifier 9 is connected to an input 26 of a circulator 19. The position of the polarization change-over 5 then determines whether a signal to be transmitted will proceed by a terminal 21 of the circulator 10 to a radiator element terminal 11 for a vertically polarized radiator element or whether the signal will proceed by a terminal 24 of the circulator 19 to a radiator element terminal 20 for a horizontally-polarized radiator element.

A receive path from the vertically-polarized radiator element proceeds through the radiator element terminal 11 to the terminal 21 of the circulator 10. Similarly, a receive path from the horizontally-polarized radiator element proceeds through the radiator element terminal 20 to the terminal 24 of the circulator 19. The receive signal is then conducted, for example, from the terminal 22 of the circulator 10 through a limiter 17 to a low-noise amplifier 15, or from the terminal 25 of the circulator 19 through a limiter 18 to a low-noise amplifier 16 in two polarization receive channels.

Further, outputs of the two low-noise amplifiers 15, 16 are connected to switch-over contacts of a polarization change-over 14. A switching arm of the polarization change-over 14 is connected to a receive contact of the transmission/reception switch 3 by a passive attenuation element 13 and by a low-noise amplifier 12. A suitable amplifier having variable gain can also be used at the location of the passive attenuation element 13.

The received signal then proceeds from the switching arm of the transmission/reception switch 3 to the antenna system feed terminal 1 by the electronically-variable phase shifter 2. When the switching arms of the polarization change-overs 5, 14 are in a lower position, operation in horizontal polarization is achieved. When the switching arms of the polarization change-overs 5, 14 are in an upper position, operation in vertical polarization is achieved.

As illustrated in FIG. 1, a power supply circuit 27, a control circuit 28 for operating the phase shifter 2 and the polarization change-overs 5 and 14 and a terminal multiplexer 29 having contact pins can also be provided as part of the module. The polarization change-overs 5, 14 are inserted in a small signal portion of the transmission/reception module, where the transit losses are of less significance. Two separate polarization channels for the transmit and receive modes are formed in the direction toward the antenna side of the transmission/reception module by providing high-power amplifiers 8, 9, low-noise amplifiers 15, 16, and circulators 10, 19. Thus, only the transit attenuation of a single circulator is present between the high-power amplifier and radiator element. Further, only one polarization channel is activated at a given time. Therefore, as the power supply is switched between the two polarization channels, DC power is supplied to only one of the polarization channels in the transmission/reception module.

Additionally, an important advantage of a transmission/reception module constructed in accordance with the principles of the present invention is that the resulting insulation between the two antenna polarizations eliminates the need to consider the decoupling qualities of a single power polarization change-over, unlike the known transmission/reception modules. In the known transmission/reception modules, the decoupling qualities of a single power polarization change-over are a limiting factor in the construction of a transmission/reception module.

As a transmission/reception module constructed in accordance with the principles of the present invention requires a few additional components and circuitry, a slight increase in the size of the transmission/reception module results. However, as the additional components are extremely small and require little circuitry, the slight increase in the overall system outlay is insignificant compared to the savings in primary power consumption over the power consumption of a known transmission/reception module having the same signal-to-noise ratio, where the polarization switching occurs directly at the radiator element terminals.

Figure 2:
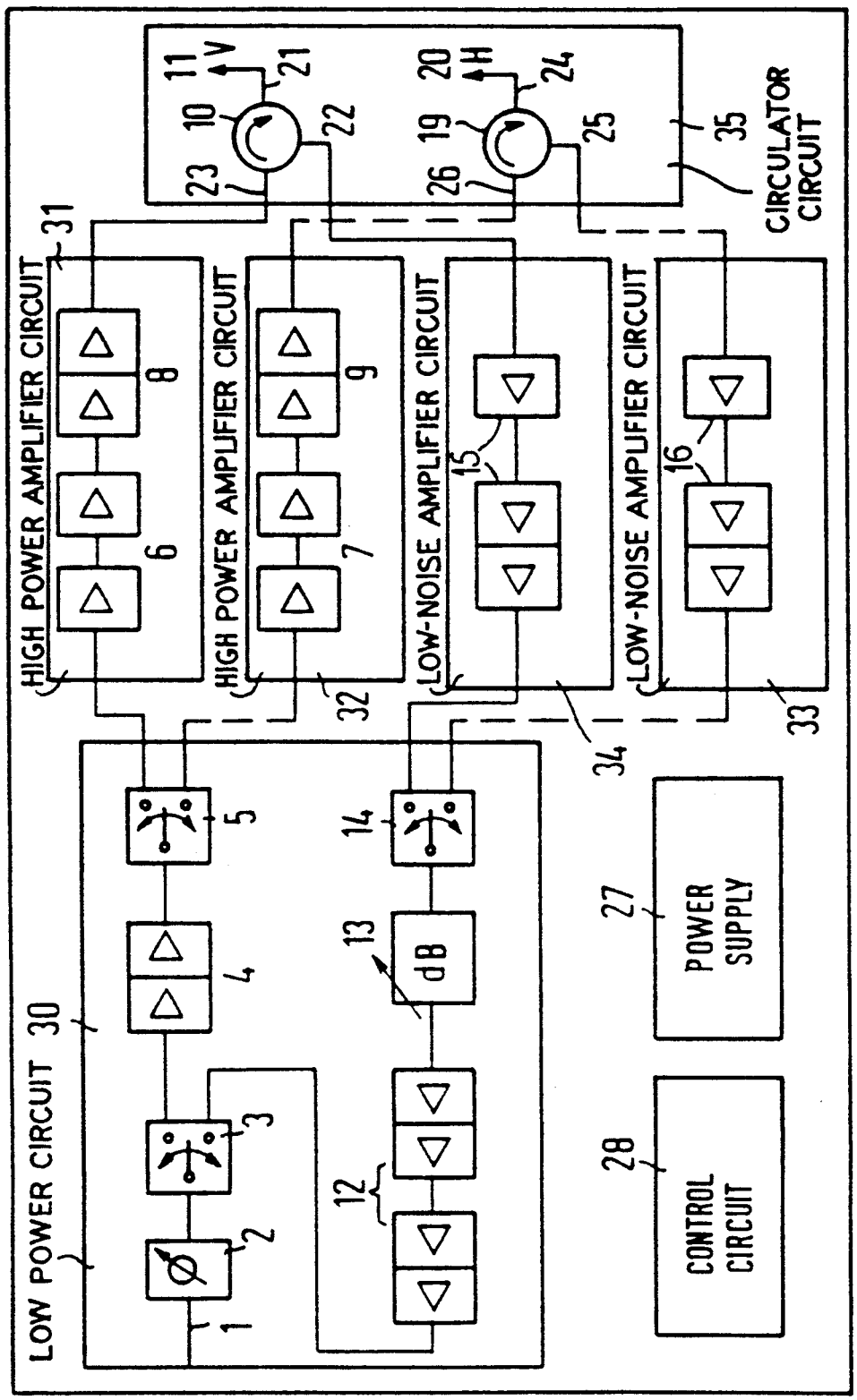
FIG. 2 illustrates a bock circuit diagram of sub-units of the transmission/reception module illustrated in FIG. 1.

FIG. 2 illustrates the RF or HF sub-units 30 through 35 of a transmission/reception module constructed in accordance with the principles of the present invention. The sub-units are a low-power RF or HF circuit 30, high-power amplifier units 31, 32, low-noise amplifier circuits 33, 34, a circulator circuit 35, a power supply circuit 27, and a control circuit 28. FIG. 2 illustrates the logical arrangement of these sub-units 30 through 35 in a housing for a transmission/reception module constructed in accordance with the principles of the present invention. The individual circuit blocks in the sub-units 30 through 35 correspond to the circuit blocks having the same reference numeral illustrated in FIG. 1.

A signal in the low-power RF or HF 30 proceeds, during a transmission cycle, from the terminal 1 through the phase shifter 2 to the transmission/reception switch 3. The transmission/reception switch 3 is connected to the low-noise MMIC small signal amplifier 4. The polarization change-over 5 is then also located in the transmission path of the sub-unit 30. The power amplifier sub-unit 31 contains a linear amplifier 6 and a high-power amplifier 31. Similarly, the power amplifier sub-unit 32 contains the linear driver amplifier 7 and the high-power amplifier 32.

An output of the high-power amplifier 8 of the sub-unit 31 is connected to an input 23 of the circulator 10, whose output signal is supplied from the terminal 21 to the terminal 11 for the vertically-polarized radiator element. A circulator circuit 35 includes the circulator 10 as a component part and the circulator 19 as a component part, where the terminal 26 of the second circulator 19 accepts the transmission output signal of the high-power amplifier 9 in the sub-unit 32. The transmission signal delivered to the terminal 20 for the horizontally-polarized radiator element is derived at the terminal 24 of the circulator 19. The circulators 10, 19 separate the transmission and reception signals for the vertical and horizontal polarizations, respectively. The reception signal of the vertically-polarized radiator element proceeds through the terminal 11 to the terminal 21 of the circulator 10, and then from the terminal 22 of the circulator 10 to the sub-unit 33 having the low-noise amplifier 16. Similarly, the signal received from the horizontally-polarized radiator element is conducted from the terminal 20 through the terminal 24 of the circulator 19 to the terminal 25 of the circulator 19 from which it proceeds to sub-unit 34 having the low-noise amplifier 15.

The amplified output signals of the sub-units 33, 34 are supplied to the switch-over contacts of the polarization change-over 14 in the sub-unit 30. The attenuation element 13 following the polarization change-over 14 serves to control the gain of the individual transmission/reception module. As a result of the gain control of the individual transmission/reception module, an amplitude weighting of the antenna aperture is enabled during the reception cycle. The required gain of the reception path is achieved by providing two serially-connected low-noise MMIC amplifiers 12. The transmission/reception switch 3 connects the reception path to the terminal 1 by the phase shifter 2.

Further, monolithically integrated gallium arsenide microwave circuit technology can be used to form the RF or HF sub-units 30 through 35, whereas CMOS technology can be used to fabricate the control circuit 28.

Additionally, in constructing a transmission/reception module in accordance with the principles of the present invention, it is critical that the polarization change-over 5 for the transmission path is arranged in the sub-unit 30 between the low-noise amplifier 4 and the terminals for the high-power amplifier sub-units 31, 32 therein. It is also critical that a second polarization change-over 14 is provided in the reception path in the sub-unit 30 for low-power to receive signals from the sub-unit 33 or 34, respectively, having the low-noise amplifiers 15 or 16, respectively. The transmission and reception path of every polarization channel is separated by one of the circulators 10, 19 at the output of the transmission/reception module. The same type of switch can be used for the two polarization change-overs 5, 14, which operate in the low-power range, as for the transmission/reception switch 3.

Further, the supply power of the power amplifiers 8, 9 in the sub-units 31, 32, respectively, need not increase, since only one of the two polarization channels is active during a transmission period. Further, as only one of the sub-units 33 or 34 is activated during a reception cycle, the power supplied for the sub-units 33, 34 also need not increase during the reception cycle. Additionally, the power supply circuit 27 is provided with either switches, power gates or other suitable devices for selectively supplying power to either the power amplifier sub-unit 31 or 32, whichever is active.

The control circuit 28 is provided for electronically controlling the phase shifter 2 and the polarization change-overs 5 and 14.

Although various minor modifications may be suggested by those versed in the art, it should be understood that I wish to embody within the scope of the patent granted hereon all such modifications as reasonably and properly come within the scope of my contribution to the art.

I claim:

1. An active transmission/reception module in an integrated microwave circuit embodiment comprising:
   first polarization means for activating a selected polarization channel in a transmission path;
   second polarization means for activating a selected polarization channel in a reception path;
   transmission/reception switch means, having a transmit contact, a receive contact, and a switching arm, for forwarding a transmission signal along said transmission path when said switching arm is connected to said transmit contact and for receiving a receive signal along said reception path when said switching arm is connected to said receive contact;
   said transmission path defining a first path between an antenna system feed terminal and first and second radiator element terminals, said transmission path including a phase shifter, said transmission/reception switch means, said first polarization means, first and second high-power amplifiers, and first and second circulators;
   said reception path defining a second path between said antenna system feed terminal and said first and second radiator element terminals, said reception path including said phase shifter, said transmission/reception switch means, said second polarization means, first and second low-noise amplifiers, and said first and second circulators;
   said first circulator having a first terminal and a first branching terminal, said first terminal connected to said first radiator element terminal and said first branching terminal connected to a first switch-over contact of said second polarization change-over means through said first low-noise amplifier;
   said second circulator having a second terminal and a second branching terminal, said second terminal connected to said second radiator element terminal and said second branching terminal connected to a second switch-over contact of said second polarization change-over means through said second low-noise amplifier;
   said first polarization change-over means including a first switch contact, a second switch contact, and a first switching arm, said first switching arm connected to said transmit contact of said transmission/reception switch means, said first high-power amplifier connected to said first switch contact and to a first circulator input of said first cirulator, and said second high-power amplifier connected to said second switch contact and to a second circulator input of said second circulator;

said second polarization change-over means having a second switching arm connected to said reception contact of said transmission/reception switch means; and said switching arm of said transmission/reception switch means connected to said antenna system feed terminal through said phase shifter.

2. An active transmission/reception module as claimed in claim 1, further comprising a first limiter disposed between said first branching terminal and said first low-noise amplifier and a second limiter disposed between said second branching terminal and said second low-noise amplifier.

3. An active transmission/reception module as claimed in claim 1, further comprising a variable, passive attenuation element arranged in said reception path between said second switching arm and said reception contact.

4. An active transmission/reception module as claimed in claim 1, further comprising a variable gain amplifier disposed in said reception path between said second switching arm and said reception contact.

5. An active transmission/reception module as claimed in claim 3, further comprising a third low-noise amplifier disposed in said reception path between said variable, passive attenuation element and said reception contact.

6. An active transmission/reception module as claimed in claim 1, further comprising a fourth low-noise amplifier disposed between said transmit contact and said first switching arm.

7. An active transmission/reception module as claimed in claim 1, further comprising a first linear driver amplifier disposed between said first switch contact and said first high-power amplifier, and a second linear driver amplifer disposed between said second switch contact and said second high-power amplifier.

8. An active transmission/reception module as claimed in claim 7, wherein said first linear driver amplifier and said first high-power amplifier form a first sub-unit and said second linear driver amplifier and said second high-power amplifier form a second sub-unit, said active transmission/reception module further comprising power supply circuit means for selectively supplying power to at least one of said first sub-unit and said second sub-unit.

9. An active transmission/reception module as claimed in claim 8, said power supply circuit means further comprising at least one of switch means and power gate means for selectively providing power to at least one of said first sub-unit and said second sub-unit.

10. An active transmission/reception module as claimed in claim 1, further comprising control circuit means for electronically controlling said phase shifter and said first and second polarization change-over means.

* * * * *